United States Patent
Boesch et al.

[19]

[11] Patent Number: 5,841,994
[45] Date of Patent: Nov. 24, 1998

[54] PORTABLE COMPUTER WITH MULTIPLE ZOOM PORT INTERFACE

[75] Inventors: Shannon C. Boesch, Georgetown; Randall E. Juenger, Belton, both of Tex.

[73] Assignee: Texas Instruments Incorporated, Dallas, Tex.

[21] Appl. No.: 663,957

[22] Filed: Jun. 14, 1996

[51] Int. Cl.[6] .................................................. G06F 13/00
[52] U.S. Cl. .......................................... 395/293; 395/282
[58] Field of Search ................................... 395/281, 282, 395/283, 293

[56] References Cited

U.S. PATENT DOCUMENTS

| 4,942,391 | 7/1990 | Kikuta . |
| 5,481,680 | 1/1996 | Larson et al. . |
| 5,619,398 | 4/1997 | Harrison et al. ........................... 361/86 |
| 5,630,174 | 5/1997 | Stone, III et al. ....................... 395/883 |

FOREIGN PATENT DOCUMENTS

| 0 293 200 A2 | 11/1988 | European Pat. Off. . |
| 0 394 614 A2 | 10/1990 | European Pat. Off. . |
| 0490505A2 | 6/1992 | European Pat. Off. . |
| 0574748A2 | 12/1993 | European Pat. Off. . |
| 0597262A2 | 5/1994 | European Pat. Off. . |
| 0597262A3 | 5/1994 | European Pat. Off. . |

OTHER PUBLICATIONS

*IBM Technical Disclosure Bulletin*, "Method to Detect Attach and Detach External Monitor", vol. 39, No. 03, Mar. 1996, pp. 353–354.

*Primary Examiner*—Meng-Ai T. An
*Assistant Examiner*—Jigar Pancholi
*Attorney, Agent, or Firm*—Ronald O. Neerings; Richard L. Donaldson

[57] ABSTRACT

A computer has multiple PC Card slots, each capable of receiving a ZOOM video device and providing that device access to the frame buffer through a Video Feature Port (VFP) on the graphics controller. Additionally, a docking station may also access the frame buffer through the VFP. Access may be controlled by a variety of predetermined priority or user selection schemes.

6 Claims, 3 Drawing Sheets

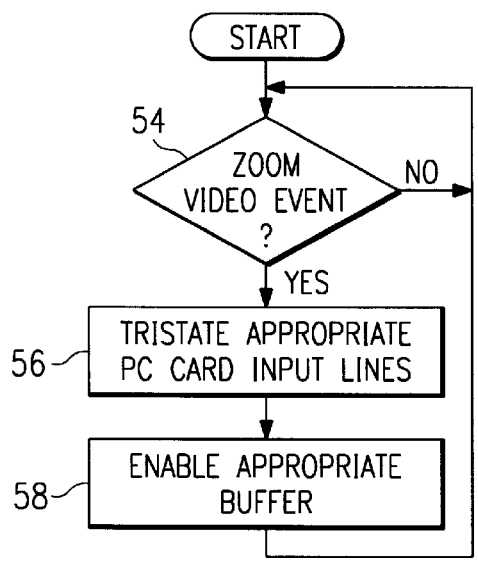
FIG. 3
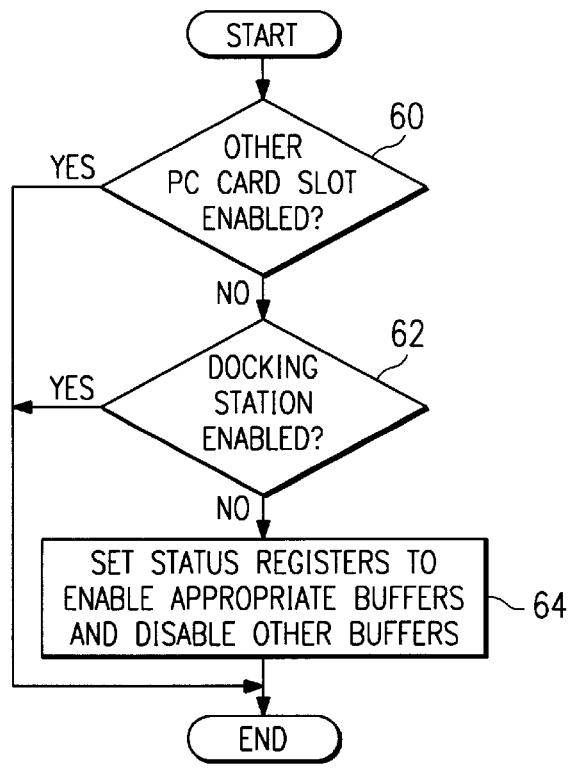
FIG. 4
FIG. 5
| ZOOMEN | ZOOMENPORT | ZOOMENA | ZOOMENB | ZOOMENDOCK |
|--------|------------|---------|---------|------------|
| 0 | 0 | 0 | 0 | 1 |
| 0 | 1 | 0 | 0 | 1 |
| 1 | 0 | 1 | 0 | 0 |
| 1 | 1 | 0 | 1 | 0 |

PORTABLE COMPUTER WITH MULTIPLE ZOOM PORT INTERFACE

BACKGROUND OF THE INVENTION

1. Technical Field

This invention relates in general to computers and, more particularly, to a computer with a multiple zoom port interface.

2. Description of the Prior Art

For many years, the popularity of portable computers has risen as the size and weight of the portable computer has been reduced. Early portable computers were known as "luggable" computers, since they could be transported, but were only slightly smaller and lighter than comparable desktop computers. "Laptop" computers were smaller and lighter, but generally had reduced features and flexibility because most of the circuitry needed to be designed into the laptop motherboard without the option of expansion boards.

Notebook computers are significantly smaller and lighter than laptop computers. These computers can easily be carried in a briefcase. Because of their size, it is not possible to provide a bus into which the user may place peripheral cards. To allow the user some flexibility in obtaining processing functions not provided on the notebook's system board, PC card slots, also known as PCMCIA (Personal Computer Memory Card International Association) slots, are often provided on the notebook computer. Many peripherals, such as modems, network interfaces, and hard drives, are available to connect to the PC card slot. Some desktop systems also provide PC card slots.

The widening use of multimedia in notebook computer systems has put increasing demands on notebook video systems. Some video features such as decoding and playback of MPEG1 video (which is a video compression protocol specified by Motion Pictures Entertainment Group) can require the full processing power of a 120 megahertz PENTIUM (by Intel Corporation) processor. This is undesirable in a notebook platform since a PENTIUM processor running at full speed for an extended amount of time generates a large amount of heat and dissipates a large amount of power. Also, if a processor's bandwidth is completely used for decoding the system is unable to process any other tasks, thereby eliminating, or greatly reducing the efficiency of, multitasking.

Supporting 24-bit color at thirty frames per second at a resolution of 1024×768 requires a data bandwidth of around 70 megabytes per second. This type of bandwidth requirement uses up almost all of the theoretical bandwidth of the PCI (Peripheral Connect Interface) bus found in most computers today. Once all bandwidth in a system is used to fetch and display data, there is no bandwidth left to transfer video data between special video processing chips. ZOOM video was incorporated into the PC card specification to alleviate the processing overload presented by multimedia.

ZOOM video cards are designed to fit into standard PC card slots. Systems that support ZOOM cards have an 8- or 16-bit video feature bus that connects the video feature bus of the graphics controller directly to the PC card slot. The video feature bus allows a device to pass video data directly to the video frame buffer via the graphics controller, rather tying up the system bus, typically a PCI bus. With ZOOM video, a PC Card device can connect to the video feature bus to bypass the PCI bus. The video feature port on the graphics controller, which provides access to the video feature bus, is enabled only when the graphics controller is in video feature port mode.

Present day systems which support ZOOM video, wire the PC card slot directly to the video port on the graphics controller. This, however, is an acceptable solution in systems with a single PC card slot. Since systems with multiple PC card slots are desirable because of the varied devices which may be used in the PC card slot, it is an unacceptable solution in many cases.

Therefore, a need has arisen for a computer system with multiple PC card slots which support ZOOM video.

SUMMARY OF THE INVENTION

In the present invention, a computer comprises a processor coupled to a graphics controller. The graphics controller is coupled to a frame buffer memory and includes a feature bus for allowing an external device to store data in the frame buffer memory. Two or more connectors receive devices selected by the user. Buffer circuitry is coupled between said connectors and said feature bus for selectively enabling one of said connectors to access the feature bus.

The present invention provides significant advantages over the prior art. First, multiple slots can be provided for receiving ZOOM video devices without conflicts occurring on the feature bus. Second, the computer is compatible with a docking station which may need a connection to the feature bus. Third, access to the feature bus can be controlled by priority between devices, user selection, or other schemes. Fourth, the circuitry and software for adapting an existing computer design to allow multiple ZOOM devices is minimal.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates a flow chart describing operation of the circuit of FIG. 2;

FIG. 4 illustrates a flow chart describing a first embodiment for providing priority between multiple ZOOM devices;

FIG. 5 shows a logic table for enabling buffers to prevent conflicts between devices in response to control signals;

DETAILED DESCRIPTION OF THE PREFERRED EMBODIMENT

The present invention is best understood in relation to FIGS. 1–6 of the drawings, like numerals being used for like elements of the various drawings.

Figure 1:
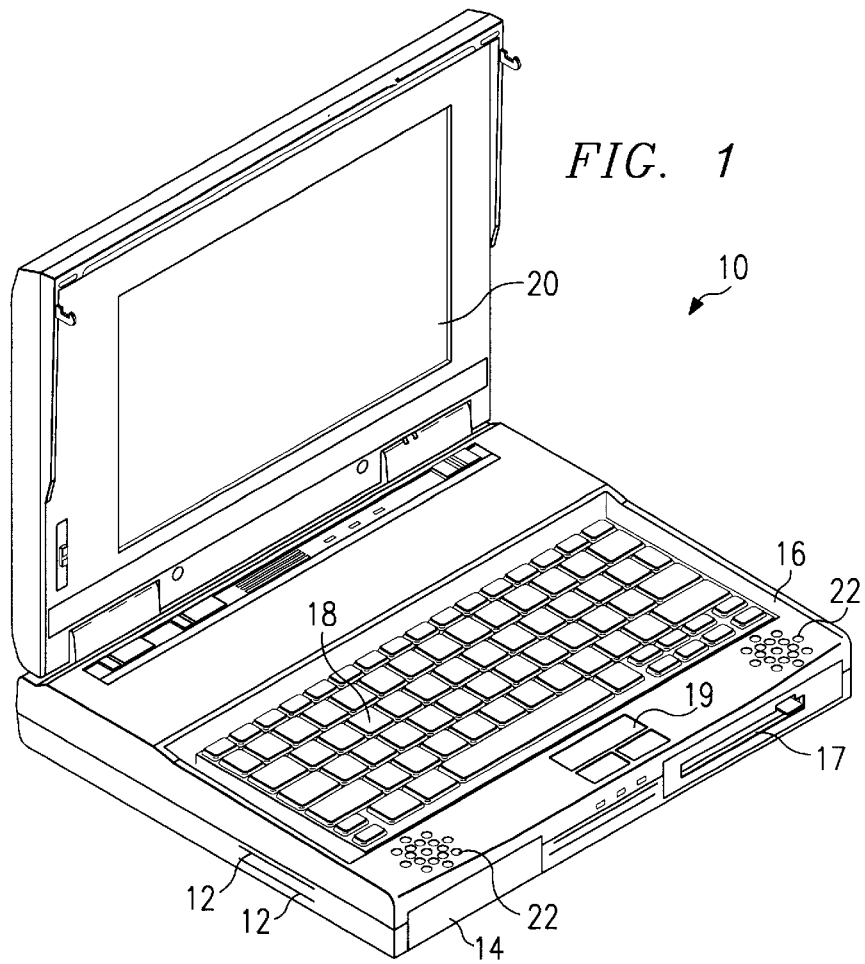
FIG. 1 illustrates a perspective view of a notebook computer.

FIG. 1 illustrates a perspective view of a computer system 10 having two PC Card slots 12 for receiving PCMCIA and CardBus devices and a modular bay 14 for receiving one of a plurality of modular devices, such as a floppy drive, hard disk drive, CD-ROM drive, magneto-optical (MO) drive, battery, or cellular telecommunication device. The computer system 10 includes a main housing 16, within which the computer electronics are housed. The PC Card slots 12 and modular bay 14 are accessible through the housing. A battery 17 is placed next to the modular bay 14. A keyboard 18 is placed at the top of the main housing 16. Keyboard 18, in the preferred embodiment, includes a pointing device, such as touch pad 19. A display 20 is attached to the main housing 16. Typically, the display 20 is connected to the main housing 16 by a hinge, such that the display 20 can be folded away from the main housing 16 when the computer 10 is in use and folded flush with the main housing 16 for portability when the computer 10 is inactive. For a multimedia computer, speakers 22 are shown as provided in the main housing 16.

While FIG. 1 illustrates a specific notebook computer design, it should be noted that many modifications could be made. For example, many different pointing devices could be used, such as a mouse, a trackball or an integrated joystick. Other features, such as speakers, are optional and not needed to practice the present invention, as would be known to one skilled in the art. The arrangement of the components of the computer could also be modified by the system designer.

Figure 2:
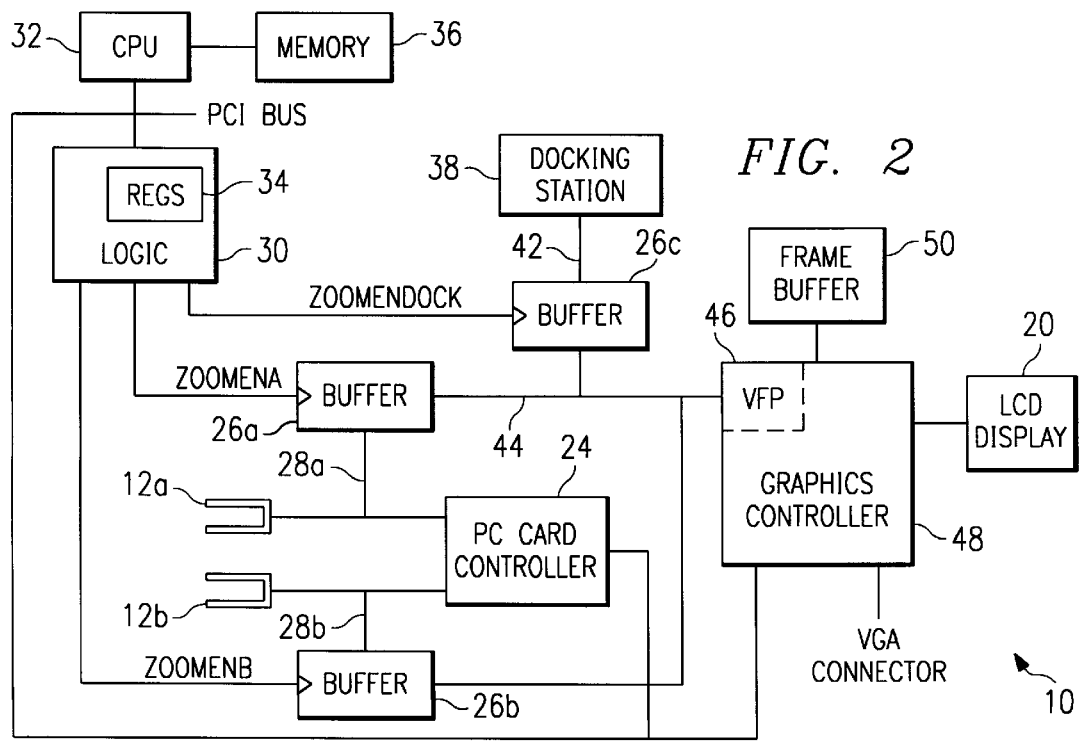
FIG. 2 illustrates a block diagram of a circuit to allow multiple ZOOM devices.

FIG. 2 illustrates a block diagram of a circuit for allowing multiple ports to use ZOOM video without conflicts. PC Card slots 12a and 12b are coupled to a PC Card controller 24. Buffers 26a and 26b are coupled to by lines 28a and 28b to, and used for ZOOM video from PC Card slots 12a and 12b respectively. The enable port of buffer 26a is coupled to a ZOOMENA signal from logic 30 and the enable port of buffer 26b is coupled to a ZOOMENB signal from logic 30. Logic 30 is coupled to CPU (central processing unit) 32 and includes status registers 34. CPU 32 is coupled to memory 36.

The notebook computer 10, in the preferred embodiment, can be mounted to a docking station 38. The docking station 38 allows additional hardware to be coupled to the computer 10. Lines 42 used by the docking station for ZOOM video are coupled to buffer 26c. Buffer 26c is enabled by the ZOOMENDOCK from logic 30. Buffers 26a–c are coupled to bus 44, which is connected to the VFP (video feature port) 46 of graphics controller 48. Graphics controller 48 is coupled to frame buffer 50. The graphics controller 48 outputs pixel data to the flat panel display 20 and to a VGA connector which supports an external display.

It should be noted the block diagram of FIG. 2 shows connections between the various blocks needed to demonstrate the present invention. In an actual computer circuit, there are many more components and many more connections between components as would be known to one skilled in the art. The invention can be practiced with a conventional computer circuit design with the modifications described herein.

The frame buffer 50 is a memory which stores the information to be displayed by display 20. Each pixel in display 20 maps to one or more locations in the frame buffer 50. For example, using a 800×600 display in 256 color mode, each of the 480000 pixels (800×600) would have a corresponding byte in memory, since a byte can identify any one of the 256 colors. In 256 color mode, the value of each byte references a color palette with 256 entries; each entry identifying a RGB (red, green, blue) color. The palette is typically stored in unused portions of the frame buffer 50. Higher colordepth modes do not use a palette. Instead, each pixel maps to more than one byte. In 24-bit color, each pixel maps to three bytes in the frame buffer—the three byte set provides 8-bit values for the red, blue and green components of each pixel. In lower colordepth configurations, such as monochrome, a single byte in the frame buffer 50 may provide the information for multiple pixels in the display 20.

During operation of the computer 10, the graphics controller 48 manipulates the values in the frame buffer 50. The graphics controller includes an interface which continually scans through the frame buffer 50 and outputs updated display information to the display 20 and the VGA connector.

CPUs and graphics controllers, in general, are incapable of handling full-motion video. Many multimedia applications, however, use full motion video in games, TV tuner support and video conferencing. Video hardware which supports full motion video, however, must have access to the frame buffer 50 in order to transmit video information to the display 20. The VFP 46 allows an external video source to pass data to the frame buffer 50 via the graphics controller without tying up the PCI bus. VFPs have been standard on desktop graphic controllers for a number of years.

Recently, Zoomed Video (ZV) technology has set standards for PC Cards which access the frame buffer through the VFP 46. When inserted, PC Cards which support Zoomed Video transmit information identifying the need to use the VFP 46.

The present invention allows multiple ports to accept ZOOM video cards. In operation, buffers 26a–c serve as conduits between the VFP port 46 and the PC Card slots 12a–b and the docking station 38, respectively. During operation of the computer 10, the buffers 26a–c can be controlled as described hereinbelow to allow access of a single ZOOM enabled device to the VFP port, while allowing multiple ZOOM devices to exist in the system without causing conflicts.

Control of the buffers 26a–c is implemented by the logic 30 in conjunction with one or more software routines executed by CPU 32. Card Services and Socket Services (often referred to collectively as Card and Socket Services) are two routines used in connection with the PC Card slots 12a–b. PC Card controllers, such as controller 24, are not software compatible with one another. In order to allow application programs to function with multiple PC Card controllers, Socket Services software provides an interface which stands between the PC Card controller and the software. The Socket Services are generally provided by the manufacturer of the particular PC Card controller used in the computer. Since the Socket Services are defined in the PC Card specification, software can make calls to the Socket Services without knowing the specific commands for controlling the PC Card controller directly. The Socket Services identify how many sockets are supported by the computer and detects insertion and removal of devices from the PC Card slots.

Card Services, on the other hand, allocate system resources, such as memory and interrupts, each time a PC Card is inserted or removed. The Card Services are aware of the computer's available resources and administrates those resources. When a PC Card is inserted, Card Services determines what resources will be needed by that card and configures the card appropriately. Resources allocated to that card are then designated as unavailable to other devices. When a card is removed, the previously dedicated resources are returned to the Card Services.

PC Card controllers which support ZOOM video have Card Services which identify the VFP port 46 as a needed resource. When a PC Card indicates that it needs access to the VFP port 46, inputs to the PC Card controller which are shared with the VFP port are tri-stated for that particular slot.

Similarly, a computer which can connect to a docking station has docking software executed by the CPU 32 which performs the same general services as the Card and Socket Services perform for a PC Card slot. When docked, the computer must be reconfigured to account for the additional functions provided through the docking system; for example, a docking station may provide an enhanced video/graphics controller and a network interface.

Operation of the circuit of FIG. 2 is described in connection with the flow chart of FIG. 3. In decision block 54, the computer 10 waits for a ZOOM video mounting event, i.e., either mounting a ZOOM video PC Card in one of slots 12a–b or accessing the VFP 46 by the docking station 38. If the mounting event involves the PC Card slots 12a–b, the use of ZOOM video will be detected by the Card and Socket Services when the card requests access to the VFP port 46. If the mounting event involves the docking station, the docking software will detect whether the docking station has an enabled ZOOM video card. In the preferred embodiment, a status bit at an I/O memory address (location 4EC, bit "0", in the embodiment described herein) is set when the docking station is accessing ZOOM video. For example, if I/O memory address 4EC, bit "0" is set to "1", the docking station is accessing ZOOM video and if bit "0" is set to "0", the docking station is not accessing ZOOM video.

In block 56, if the ZOOM video event was the insertion of a ZOOM video PC Card, the PC Card controller 24 is notified so that it can tri-state the appropriate input lines. In block 58, one of the buffers 26a–c is enabled and the other buffers are disabled, so that only one device (PC Card or docking station) has access to the VFP port 46 at a time.

The selection of which buffer to enable in block 58 can be based on different criteria. One method is shown in the flow chart of FIG. 4. This method uses pre-set criteria for determining priority between devices. In block 60, when a PC card is inserted (which is detected by Socket Services), the Card and Socket Services determines whether the other PC Card slot is coupled to a device which uses ZOOM video. This can be determined by interrogating the device using Card Services or by maintaining status information on each card in registers 34. If the other PC Card slot is coupled to a device using ZOOM video, under the priority scheme of FIG. 4, then the newly inserted card does not get access to the VFP 46.

In block 62, the Card Services determines whether the docking station is using ZOOM video. This can be accomplished, for example, by checking a status bit at a predetermined I/O memory address. If the docking station is using ZOOM video, then the newly inserted card does not get access to the VFP 46. If neither the other PC Card slot or the docking station is using ZOOM video, the buffers 26a–c are configured to allow the newly inserted card to access the VFP 46 in block 64.

If the docking station needs the VFP 46 for a ZOOM operation, the docking station software can take control from either PC Card slot 12a–b. Thus, in this embodiment, the docking station has highest priority, since it can gain control of the VFP 46 from either PC Card slot 12a–b, and an earlier-inserted PC Card devices has priority over a later inserted PC Card device.

In the preferred embodiment, two control bits, ZOOMEN and ZOOMENPORT, are used to set the buffers 26a–c. These control bits are stored in registers 34 and can be accessed at I/O memory addresses. For purposes of illustration, these addresses are set at I/O address E5, bit "6" and bit "7", respectively. The logic table for these control bits in the table of FIG. 5.

ZOOMEN is set to "0" whenever the docking station 38 attempts to use the VFP 46 or when both PC Card slots are using standard (non-ZOOM video) cards. ZOOMPORT is set to "0" if PC Card slot 12a is configured for ZOOM video and is set to "1" if PC Card slot 12b is configured for ZOOM video.

By setting the ZOOMEN and ZOOMPORT status bits appropriately, any one of the buffers 26a–c can be enabled to the exclusion of the others. If ZOOMEN is set to "0", then the docking station 38 has access to the VFP 46 (i.e. ZOOMDOCK="1"). If ZOOMEN is set to "1", then PC Card slot 12a has access to the VFP 46 (i.e., ZOOMENA="1") if ZOOMPORT="0". PC Card slot 12b has access to the VFP 46 (i.e., ZOOMENB="1") if ZOOMPORT="1".

It should be noted that the priority scheme described above could be modified as desired by a system designer. For example, the system designer might always give access to a later-inserted PC Card device, rather than an earlier-inserted PC Card device.

Figure 6A:
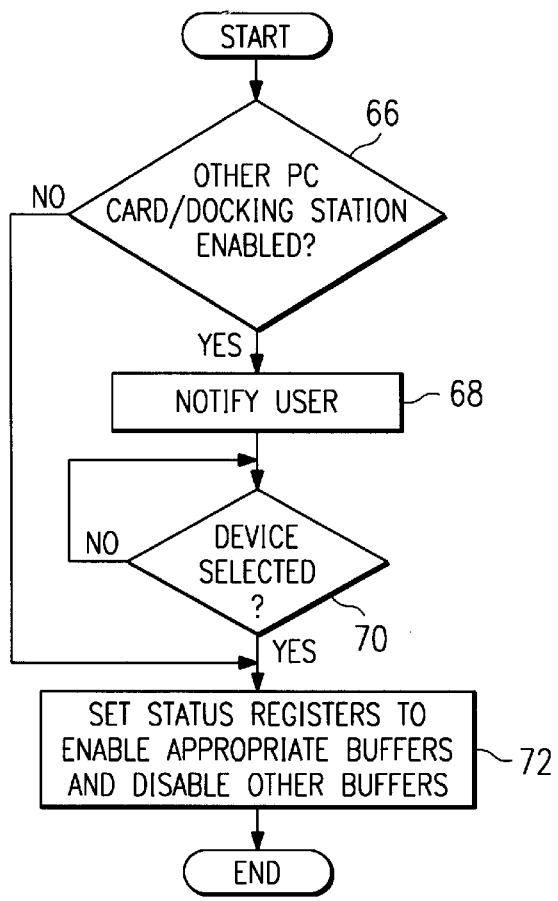
FIG. 6a illustrates a flow chart for providing user selection between potentially conflicting ZOOM devices.
Figure 6B:
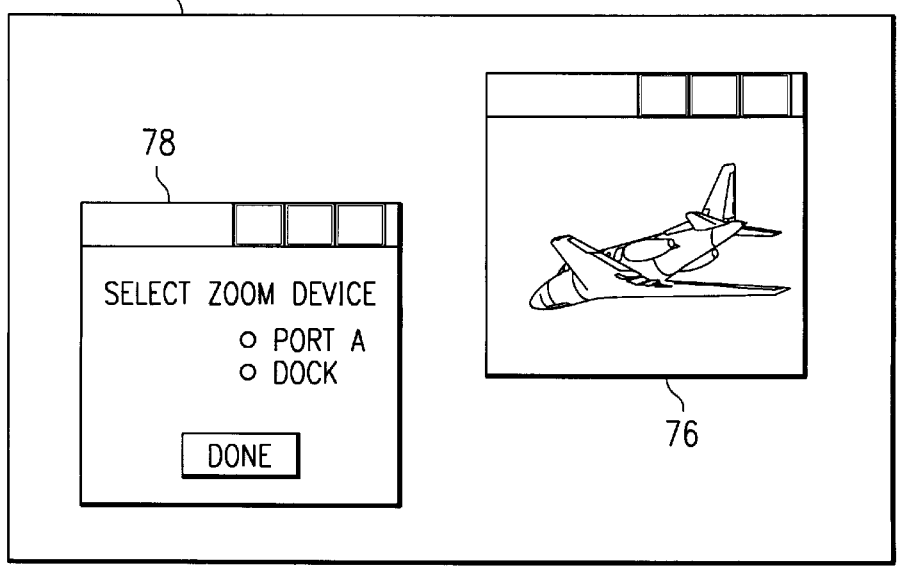
FIG. 6b illustrates a screen showing a prompt for user interaction to select a ZOOM device.

FIGS. 6a and 6b illustrate a method for block 64 of FIG. 4 which provides the user with control over which device has access to the VFP 46 at any one time. When the docking station or PC Card needs to use the VFP 46, the docking station software or Card Services software determines whether any other device also needs the VFP 46 in decision block 66. If there is another device which needs to use the VFP 46, the user is notified in block 68. The user is prompted to grant access to one of the conflicting devices in decision block 70. In block 72, the status registers are set to enable the appropriate buffer; if there are no conflicts in block 66, the requesting device is coupled to the VFP 46, otherwise the device selected in block 70 is coupled to the VFP 46.

A display screen 74 is shown in FIG. 6b, with a video window 76 generated by a ZOOM video device. When a conflict occurs in block 66 with a second ZOOM video device (in this case, the conflicting devices are a ZOOM video PC Card in slot 12a and the docking station 38), a selection window 78 is generated prompting the user to select one. The user can use this window to switch between devices. If a ZOOM video card was inserted into slot 12b, then a third choice (Port B) would be available in window 78 so that the user could choose between three devices.

Removal of a PC Card or disabling ZOOM video from the docking station will result in resources being returned to the system. When a ZOOM video device which had access to the VFP 46 is removed, the corresponding buffer 26a–c is disabled through the ZOOMEN and ZOOMENPORT control signals. If there is another ZOOM video device, its corresponding buffer 26 can either be enabled automatically if it is the sole ZOOM video device remaining in the system or it can be chosen through priority or user interaction if there are multiple ZOOM devices remaining in the system. Alternatively, the buffer associated with a removed device can be disabled and the system can wait for another ZOOM video event (such as removal and insertion of a ZOOM video PC Card) before another buffer 26a–c is enabled.

While control of the buffers 26a–c has been described in connection with Card and Socket Services controlling status registers at predetermined I/O addresses, other methods could accomplish the same task. For example, the control signals ZOOMEN and ZOOMENPORT could be controlled through calls to the BIOS at standardized addresses.

The present invention provides significant advantages over the prior art. First, multiple slots can be provided for receiving ZOOM video devices without conflicts occurring in the feature bus. Second, the computer is compatible with a docking station which may also need a connection to the feature bus. Third, access of the feature bus can be controlled by priority between devices, user selection, or other schemes. Fourth, the circuitry and software for adapting an existing computer design to allow multiple ZOOM devices is minimal.

Although the Detailed Description of the invention has been directed to certain exemplary embodiments, various modifications of these embodiments, as well as alternative embodiments, will be suggested to those skilled in the art. While a specific embodiment using two PC Card slots and a docking station is shown, the computer could contain any number of peripheral slots, using protocols which differ from the PC Card specification, and access to a docking station is not required. The invention encompasses any modifications or alternative embodiments that fall within the scope of the claims.

What is claimed is:

1. A computer system comprising:
   (a) a host system bus;
   (b) a processor coupled to said host system bus;
   (c) a frame buffer memory;
   (d) a graphics controller having a host port coupled to said host system bus, a feature port, a memory port coupled to said frame buffer memory, and an output port coupled to a display;
   (e) a control logic circuit having a host input coupled to said host system bus, a data storage register, and a plurality of enable outputs;
   (f) a plurality of external device connectors, each having a data lead;
   (g) an external connector control circuit having a device port coupled to the data lead of an external device connector, and a host port coupled to said host system bus; and
   (h) a plurality of independent data buffers, each data buffer having an enable input independently coupled to a distinct enable output of said control logic circuit, a data port independently coupled to the feature port of said graphics controller, and a device port independently coupled to the data lead of a particular external device connector.

2. The computer system of claim 1 in which said plurality of external device connectors includes at least one PC Card slot assembly.

3. The computer system of claim 1 in which said plurality of external device connectors includes two PC Card slot assemblies.

4. The computer system of claim 1 in which said plurality of external device connectors includes a docking station connector.

5. The computer system of claim 1 in which said plurality of external device connectors includes at least one PC Card slot assembly and a docking station connector.

6. The computer system of claim 1 in which each independent data buffer couples its data port to its device port responsive to its enable input.

* * * * *